Patented May 16, 1944

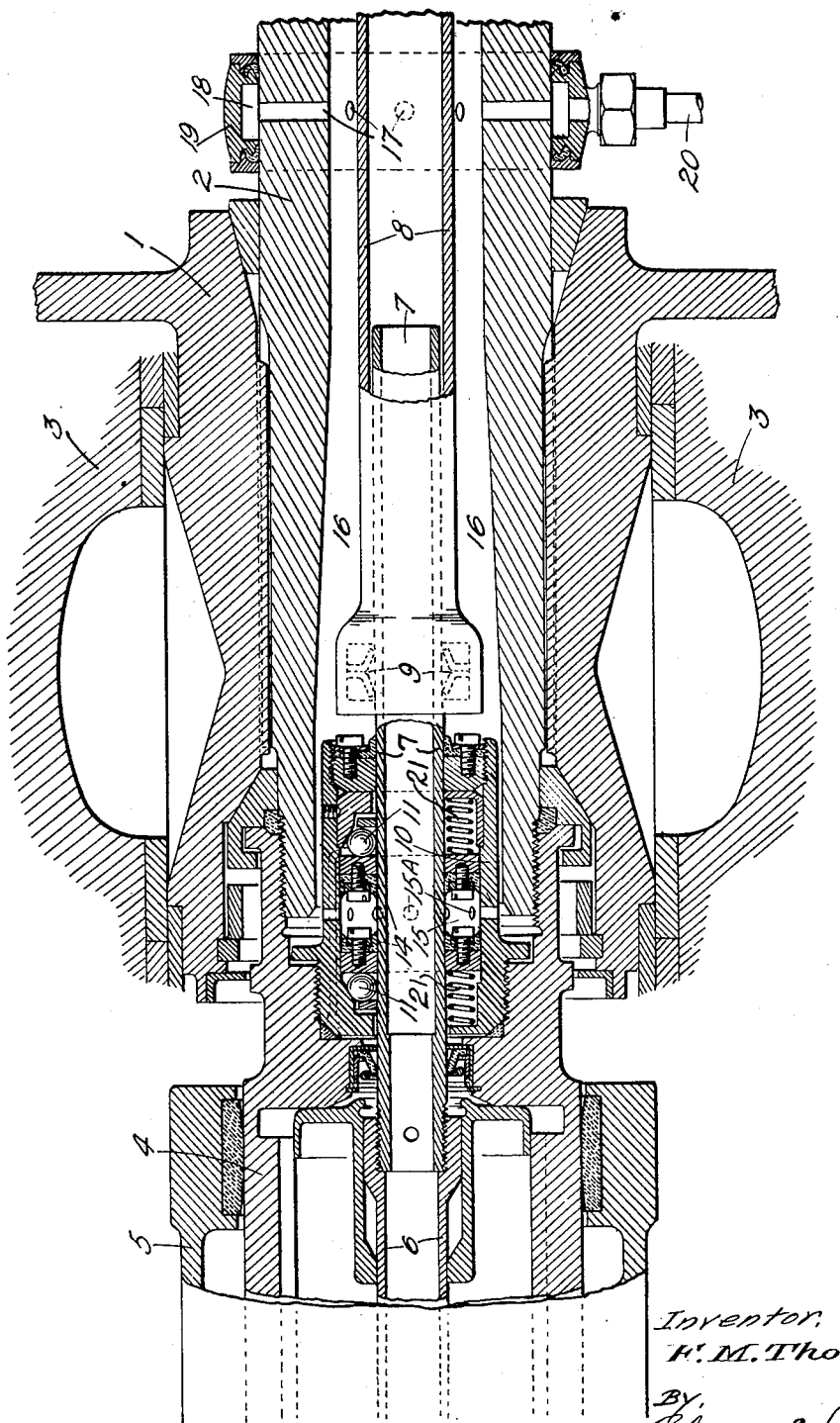

2,348,764

UNITED STATES PATENT OFFICE 2,348,764

VARIABLE PITCH AIRSCREW

Frederick Metcalf Thomas, Hatfield Aerodrome, Hertfordshire, England, assignor to The De Havilland Aircraft Company Limited, Hatfield Aerodrome, Hertfordshire, England Application November 7, 1938, Serial No. 239,387
In Great Britain November 11, 1937

14 Claims. (Cl. 170—163)

This invention relates to variable pitch airscrews, that is airscrews the pitch of whose blades can be varied in flight, either automatically or under the control of the pilot.

In order to vary the pitch of airscrew blades a mechanism is required to supply sufficient power to turn the blades against forces resisting rotation about their axis of pitch change, and this power may be derived from the rotation of the airscrew, from electrical or fluid pressure or other sources. The most common method of supplying power to pitch changing mechanism is to supply oil under pressure by one or more channels or lines from a hydraulic pressure source, e. g. engine oil pressure. The channels or hydraulic lines usually extend through the shaft to the pitch changing mechanism.

It is, however, desirable in some instances to impose a further control upon the airscrew blades, preferably actuated by hydraulic or other means corresponding to the pitch-changing means, such further control being any one of various devices, as for example, a device to control a centrifugal governor which in turn controls the transmission of power to the pitch-changing means; or a device for variably limiting the scope of pitch change; or a device for locking the pitch-changing mechanism against operation. According to this invention, there is supplied to a variable pitch airscrew of any type (shown as hydraulically operated for pitch-changing), such a further control, also shown as hydraulically operated, and in the example chosen this further control is a device for pitch-locking—that is, a lock to prevent change of pitch by appropriate and separate or other pitch-changing mechanism, until it is itself released. Therefore, to change pitch, the pitch lock must be released, by one hydraulically operated device, and then the pitch-changing device must be further operated in the example chosen, by independent hydraulic means.

A primary object of the invention, broadly stated, is to provide an airscrew assembly with one type of mechanism (e. g., mechanism to change the pitch of the blades) which is mounted for rotation with the airscrew shaft and hub, and which is energizable at will or by suitable controls, automatic or otherwise, and hydraulically or otherwise, and likewise to provide the assembly with a second type of mechanism (e. g., locking means preventing change of pitch by the first means until the locking means is released, but releasable at will to permit such pitch-changing movement) which is energizable independently of the first type of mechanism, by hydraulic means which also are mounted for rotation with the airscrew shaft or hub, such latter energization also being accomplished at the will of the pilot or automatically by suitable controls.

One specific example of the nature of the two cooperating mechanisms has been given, and as a further example, in some cases it may be an object of the invention to provide mechanism for changing the pitch of the blades, and the independently energizable mechanism may be such as will vary the ratio of the rate of propeller rotation to rate of crankshaft rotation, as by change-speed gearing.

Again, as a further example, it is an object of the invention to rotate the airscrew blades, each on its own axis, by applying hydraulic pressure to one side or to the other of a movable piston (application on one side increasing the pitch and on the other side decreasing it) suitably connected to the blades, and to govern application of the pressure fluid to one side or the other of the piston by valve means controlled by an hydraulic line independent of that line which supplies pressure to the piston.

The object of this invention may be stated, then, as the provision of an hydraulic control line, additional to the main hydraulic operating ducts (if the pitch-change mechanism is to be hydraulically operated), to control the operation of the pitch-change mechanism in accordance with control means energized through the control line.

In a variable pitch airscrew operated by hydraulic pressure from a single pitch changing conduit the auxiliary line or conduit may be parallel with the conduit for pitch change but separate therefrom, and if the pitch change conduit consists in an axial bore in the airscrew shaft, the auxiliary conduit may be concentric or offset but parallel with the axis and connected by a glanded annular chamber to the necessary source of pressure or hydraulic control. Two auxiliary control conduits, for example of some double-acting auxiliary system, may be provided in the same way, each emerging at the transmitter end, by way of separated annular chambers.

The invention is exemplified and explained with the aid of the accompanying drawing, in which the figure is a diagrammatic section of the relevant parts of an automatically variable pitch airscrew, in the plane of the axis of rotation and two blade roots.

The airscrew hub 1, mounted fast upon a hollow shaft 2, supports at least two blades of which the root is diagrammatically indicated at 3. A hydraulic jack for pitch change, mounted forward of the blades, comprises an inner cylindrical part 4, fixed relative to the shaft, and an outer cylinder 5, these being relatively sliding parts and constituting a jack operatively connected (by mechanism not shown, but known in the art) to rotate the blades on their respective axes. This jack is operated by the supply of pressure liquid through a tubular stem 6 which is co-axial with 4 and 5 and rigid with the latter. The stem 6 has screwed into it a prolongation in the form of a further tubular element 7 which is telescopically slidable in a hydraulic feed pipe 8, with which it is sealed, but slidable and if desired rotatable by virtue of a gland 9. The pipe 8, element 7, stem 6 and jack 4, 5 can therefore be regarded as a completely closed or sealed hydraulic system.

When the cylinder 5 (and hence the stem 6 which is connected thereto) cannot slide relative to the piston 4 and to the shaft to which the piston is fast, there can be no change of pitch. Means are provided to lock the parts in this position, as by wedging between the tube 7, which is fast to the stem 6, and the cage 10 which is fast to the piston 4. Such pitch locking means comprise rings of balls 11 adapted to be wedged radially against the outside of the element 7 by the cage structure 10, when the balls are forced axially by annular plungers 14 which form opposite walls of an annular pressure space 15. Upon relief of pressure in this space springs 21 move the balls from wedged or locking position. The pressure space 15 is connected by a ring of ports or openings 15A with an annular space left by the clearance between the cage 10 and the inside wall of the shaft 2, this space forming part of the annular conduit 16 surrounding the pipe 8 and part of the element 7. The conduit 16 is hydraulically connected by a further ring of ports or holes 17 with the internal channel 18 of a collar 19 which is a fluid-tight fit on the outside of the shaft 2, but which is itself non-rotatable and is supplied by the hydraulic connection indicated at 20.

The foregoing describes a lock for preventing or inhibiting change of pitch, in a variable pitch airscrew in which pitch change is hydraulically controlled. Moreover the lock, achieving an auxiliary function, has its further and separate hydraulic control comprised by the connections and conduits 20, 18, 17, 16, 15A and 15, the absence or presence, or operation or non-operation of which have virtually no relation whatever to the main control which can be said to be comprised by the conduits and elements 8, 7, 6, 5 and 4.

The mechanism in regard to which the invention has been described is that of an automatically variable pitch airscrew, the supply of pressure liquid through the pipe 8 being controlled as is customary by a centrifugal valve (not shown). It is chiefly to automatic variable pitch airscrews that the invention is intended to be applied, but the invention is not limited thereto, and may be applied to any variable pitch airscrew.

The balls 11 are normally held in locked position, wedged between the tubular element 7 and the inclined annular surfaces of the cage 10, as shown, by pressure of fluid admitted from 20 and gaining access to the space 15 between the annular plungers 14 by way of 18, 17, 16, and 15A; the light return springs 21 acting upon the plungers 14 are thereby compressed. While the balls are so wedged the outer cylinder 5, fast to 7 through 6, cannot shift relative to jack plunger 4, which is fast to 10, and without relative movement of 5 and 4 no pitch change can occur. When pitch change is required, suitable automatic or manual means (not shown, and the precise nature whereof is immaterial) cut off the supply of pressure fluid at 20, and reduce the pressure in this pitch-lock hydraulic system, permitting the springs 21 to move the plungers 14 towards one another. This releases the lock. Now when pressure is altered, positively or negatively, in the system 8, 7, 6, 5, 4, a corresponding shift of 5 occurs relative to 4, and the pitch is accordingly changed. In the newly assumed pitch position the lock is again rendered operative by readmission of pressure fluid within 15, via 20, to spread the plungers 14 apart and to reengage the balls 11 between 7 and 10. Change of pressure within 5 can no longer effect pitch change, until the balls 11 are again released, in the manner already described.

While the operation has been described with particular reference to the pitch lock, it is desired to reemphasize that the latter is merely typical of any control additional to the pitch-changing device, which is associated with the propeller, but which is hydraulically operable separately from, or in addition to and in conjunction with the pitch-changing device. Examples of other such controls have been given above.

I claim:

1. Means to control a bodily rotatable hydraulic motor, such as a pitch-changing motor carried by the shaft of an airscrew, which motor includes a fixedly mounted element operable at will in one sense or the other to control the sense of pitch change, comprising a hollow stem communicating as a conduit with the interior of the motor, and mounted for axial movement with its movable element, a hydraulic receiver surrounding said stem, and releasable locking devices controlling operation of said motor, for pitch change, said locking devices being normally engageable with the stem, and being associated with the receiver for operation thereby, and means to supply pressure fluid to the receiver, and to relieve pressure therein, for operation of the locking devices.

2. In combination with an hydraulic motor, such as the pitch-changing motor of an airscrew, which is mounted for rotation with the airscrew shaft, and which includes one part fixed upon the shaft and another part shiftable axially relative to the first, to effect pitch change, and which motor includes a stem axially movable with the axially movable motor part, and a surrounding casing fixed to the fixed motor part, means to lock said motor in any given pitch position comprising releasable locking devices interengageable between the stem and casing to prevent their relative axial movement, an hydraulic receiver operable to hold said locking devices in locked position, and conduit means independent of the hydraulic motor and its pressure supply, to supply fluid, under control, to the hydraulic receiver, to effect locking or release of the locking devices.

3. In combination with an hydraulic motor, such as the pitch-changing motor of an airscrew, which is mounted for rotation with the airscrew shaft, and which includes one part fixed upon the shaft and another part shiftable axially relative to the first, to effect pitch change, conduit means, including a hollow stem fast to the axially movable motor part, for supplying fluid to the motor to effect such pitch change, an element fixed relative to the shaft and to the fixed motor part, releasable locking devices interengageable between the stem and said fixed element to lock the hydraulic motor against relative axial movement, an hydraulic receiver operable to control the movement of said locking devices between locked and released positions, and conduit means independent of the conduit means supplying the hydraulic motor, to supply fluid for operation of the receiver.

4. The combination of claim 3, wherein the two conduit means are coaxial with the shaft and each other, and are disposed within the shaft.

5. The combination of claim 3, wherein the first hydraulic conduit means is formed, in part, by a hollow airscrew shaft, and the second hydraulic conduit means is within and coaxial with the first.

6. In combination with pitch changing means for a variable pitch airscrew having a rotative hollow shaft, a stem disposed within the shaft, rotatable with the pitch changing means, and axially shiftable in accordance with pitch change, a casing fixed relative to the shaft, and surrounding the stem, wedging devices interposed between the stem and the casing, the latter being complementally formed to effect wedging engagement of said devices between the casing and stem, upon movement of the devices in one direction, and release for axial shifting upon their movement in the opposite direction, and means to control and effect such movement including a piston slidable within the casing and engageable with the wedging devices, and means independent of the pitch changing means to supply hydraulic fluid to said piston to move the same.

7. The combination of claim 6, wherein the stem is hollow, and constitutes a conduit which forms part of the hydraulic fluid supply means to the piston.

8. Control mechanism for a variable pitch airscrew carried by a hollow shaft, comprising a pitch-changing motor mounted for rotation with the airscrew shaft and including a member shiftable axially relative to the airscrew shaft by pitch-changing operation of said motor, hydraulic means engageable with said axially shiftable member to restrain axial movement thereof, thereby to interdict pitch-changing operation of said motor, and manually operable means controllable at will during flight to supply pressure fluid to said hydraulic means following pitch-changing operation of said motor, whether to increase or to decrease the airscrew pitch, to effect such restraining engagement of said hydraulic locking means with said axially shiftable member.

9. Control mechanism for a variable pitch airscrew carried by a hollow shaft, comprising a pitch-changing motor mounted for rotation with the airscrew shaft and including a stem received within the airscrew shaft and shiftable axially relative thereto by pitch-changing operation of said motor, means within said hollow shaft operable to grip said stem to restrain such relative axial shifting thereof, thereby to interdict pitch-changing operation of said motor, means to control said gripping means to effect such gripping of said stem or release thereof, and means housed within said airscrew shaft and independent of said control means to control operation of said motor when said stem is released.

10. Control mechanism for a variable pitch airscrew carried by a hollow shaft, comprising a pitch-changing motor mounted for rotation with the airscrew shaft and including a stem received within the airscrew shaft and shiftable axially relative thereto by pitch-changing operation of said motor, hydraulic means within said hollow shaft operable to grip said stem to restrain such relative axial shifting thereof, thereby to interdict pitch-changing operation of said motor, means to supply pressure fluid to said hydraulic means to effect such gripping of said stem or release thereof, and means housed within said airscrew shaft and independent of said pressure fluid supply means to control operation of said motor when said stem is released.

11. In pitch-changing mechanism for a variable pitch airscrew carried by a rotative shaft having an axial bore, a pitch-changing hydraulic jack mounted upon the shaft for rotation with the airscrew, hydraulic means including a hollow stem connected for axial movement with a jack member and extending through the bore in the airscrew shaft to control the sense of operation of the jack to effect increase or decrease of pitch, stop means within the axial bore of and mounted for rotation with the airscrew shaft and operable to restrain axial movement of said stem, thereby to interdict pitch-changing movement of said jack, and means including an hydraulic line extending through the airscrew shaft chargeable under control with pressure fluid to control engagement of said stop means with said stem.

12. A variable pitch airscrew having pitch-changing mechanism including a pitch-changing motor mounted for rotation with the airscrew, and a motor control for controlling said motor as to sense of operation for selectively establishing an increased or decreased pitch, an hydraulically actuated motor movement arresting device also mounted for rotation with the airscrew and operative directly upon said pitch-changing motor to restrict operation thereof despite motor energizing operation of said control, and an hydraulic line for the operation of said motor movement arresting device, such line being independent of said pitch-changing motor and control therefor.

13. The combination with a variable pitch airscrew, of a hydraulic pitch-changing motor carried by and bodily rotating with the airscrew, a conduit for pressure fluid connected to said motor and extending along the airscrew shaft, means for controlling the flow of fluid through said conduit for normally governing pitch-changing operation of said motor, locking means likewise mounted for bodily rotation with the airscrew, and arranged for locking engagement with said pitch-changing mechanism, and operating means for said locking means hydraulically independent of said pitch-changing motor controlling means, and operable to render said controlling means inoperative to effect pitch-changing control of said motor by effecting locking engagement of said locking means with said pitch-changing mechanism, said operating means including a second conduit extending along the airscrew shaft for conducting fluid to effect operation of said operating means.

14. An airscrew according to claim 13, in which the hydraulic conduits are coaxial with the shaft and one within another.

FREDERICK M. THOMAS.